(12) United States Patent
Jakobsson et al.

(10) Patent No.: US 7,730,518 B2
(45) Date of Patent: Jun. 1, 2010

(54) METHOD AND APPARATUS FOR GRAPH-BASED PARTITION OF CRYPTOGRAPHIC FUNCTIONALITY

(75) Inventors: Bjorn Markus Jakobsson, Hoboken, NJ (US); Burton S. Kaliski, Jr., Wellesley, MA (US)

(73) Assignee: EMC Corporation, Hopkinton, MA (US)

( * ) Notice: Subject to any disclaimer, the term of this patent is extended or adjusted under 35 U.S.C. 154(b) by 1981 days.

(21) Appl. No.: 10/631,989

(22) Filed: Jul. 31, 2003

(65) Prior Publication Data

US 2005/0036615 A1 Feb. 17, 2005

(51) Int. Cl.
*G06F 21/00* (2006.01)

(52) U.S. Cl. .......................................................... 726/1
(58) Field of Classification Search ........................ 726/1
See application file for complete search history.

(56) References Cited

U.S. PATENT DOCUMENTS

| | | | |
|---|---|---|---|
| 4,881,264 A | | 11/1989 | Merkle |
| 5,892,900 A | * | 4/1999 | Ginter et al. .................. 726/26 |
| 6,078,888 A | * | 6/2000 | Johnson, Jr. .................... 705/1 |
| RE36,918 E | | 10/2000 | Micali |
| 6,539,092 B1 | | 3/2003 | Kocher |
| 6,985,583 B1 | * | 1/2006 | Brainard et al. ............... 380/44 |
| 7,096,356 B1 | * | 8/2006 | Chen et al. ................... 713/163 |
| 7,231,517 B1 | * | 6/2007 | Mashayekhi ................ 713/167 |
| 2002/0094088 A1 | * | 7/2002 | Okaue ......................... 380/278 |
| 2002/0161925 A1 | * | 10/2002 | Munger et al. .............. 709/241 |
| 2003/0009666 A1 | | 1/2003 | Jakobsson |
| 2003/0016826 A1 | * | 1/2003 | Asano et al. ................. 380/277 |
| 2003/0126464 A1 | * | 7/2003 | McDaniel et al. ........... 713/201 |
| 2003/0217265 A1 | * | 11/2003 | Nakano et al. .............. 713/158 |
| 2006/0218651 A1 | * | 9/2006 | Ginter et al. .................. 726/27 |
| 2006/0242075 A1 | * | 10/2006 | Ginter et al. .................. 705/54 |

(Continued)

FOREIGN PATENT DOCUMENTS

WO WO 02/084944 A1 10/2002

(Continued)

OTHER PUBLICATIONS

U.S. Appl. No. 09/304,775, filed May 4, 1999, Brainard et al., "System and Method for Authentication Seed Distribution."

(Continued)

*Primary Examiner*—Matthew B Smithers
*Assistant Examiner*—Tamara Teslovich
(74) *Attorney, Agent, or Firm*—Ryan, Mason & Lewis, LLP

(57) ABSTRACT

Techniques are disclosed for partitioning of cryptographic functionality, such as authentication code verification or generation ability, so as to permit delegation of at least one of a number of distinct portions of the cryptographic functionality from a delegating device to at least one recipient device. The cryptographic functionality is characterizable as a graph comprising a plurality of nodes, and a given set of the nodes is associated with a corresponding one of the distinct portions of the cryptographic functionality. Information representative of one or more of the nodes is transmitted from the delegating device to the recipient device such that the recipient device is thereby configurable for authorized execution of a corresponding one of the distinct portions of the cryptographic functionality. Advantageously, the invention provides a particularly efficient mechanism for the provision of cryptographic functionality in accordance with a subscription model.

30 Claims, 6 Drawing Sheets

U.S. PATENT DOCUMENTS

2006/0248016 A1* 11/2006 Ginter et al. .................. 705/54
2007/0226807 A1* 9/2007 Ginter et al. .................. 726/27

OTHER PUBLICATIONS

D. Boneh, "Identity-Based Encryption from the Weil Pairing," Proceedings of Crypto 2001, pp. 1-31.

"IBM Secure E-mail," http://crypto.stanford.edu/ibe, pp. 1-5, 2002.

O. Goldreich, "Self Delegation with Controlled Propagation—or—What if you Lose Your Laptop," Proceedings of Crypto 1998, 19 pages.

M. Naor et al., "Universal One-Way Hash Functions and their Cryptographic Applications," http://citeseer.nj.nec.com, 15 pages, 1995.

* cited by examiner

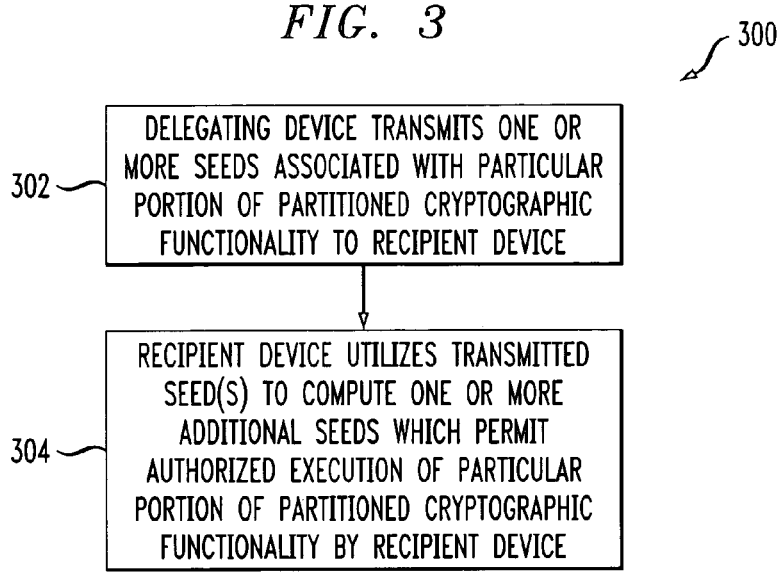
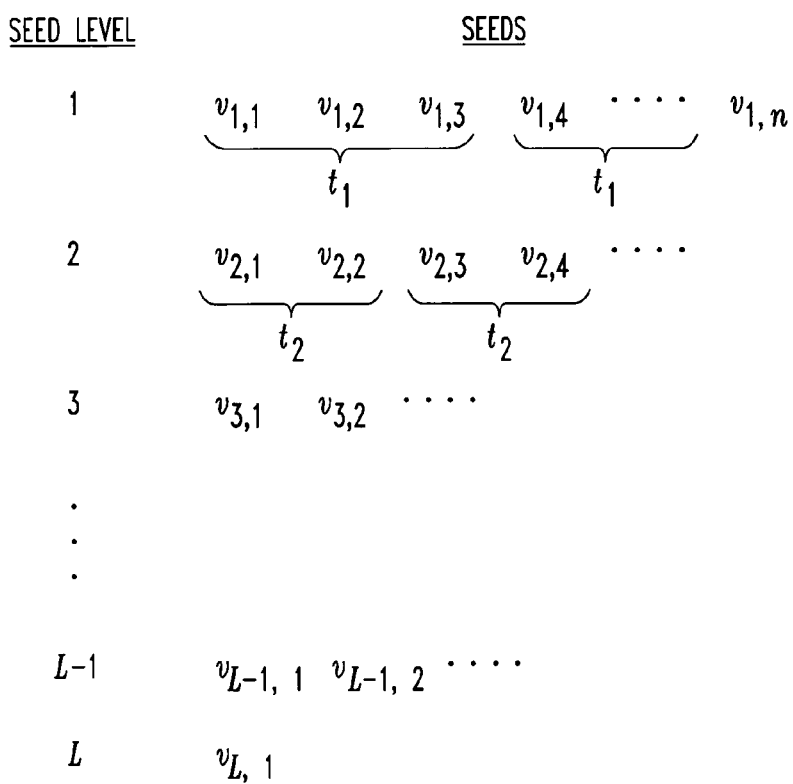

METHOD AND APPARATUS FOR GRAPH-BASED PARTITION OF CRYPTOGRAPHIC FUNCTIONALITY

FIELD OF THE INVENTION

The present invention relates generally to the field of cryptography, and more particularly to techniques for partitioning of cryptographic functionality among multiple processing devices or associated entities.

BACKGROUND OF THE INVENTION

Conventional approaches to partition of cryptographic functionality include a number of techniques involving delegation of cryptographic functionality from one entity to another.

One such technique permits delegation of decryption ability, and is referred to as Identity-Based Encryption (IBE). IBE is described in greater detail in, for example, D. Boneh and M. Franklin, "Identity-Based Encryption from the Weil Pairing," Proceedings of Crypto 2001, and in IBE Secure E-mail, http://crypto.stanford.edu/ibe, both of which are incorporated by reference herein. In this technique, an authority delegates decryption ability to a recipient of ciphertexts.

In the IBE technique, the granularity with which the decryption ability can be delegated is inherently tied to intervals measured in time, namely, update intervals of associated public keys, rather than the number of ciphertexts the recipient can operate on. This results in a number of significant problems. For example, the IBE technique does not allow the delegation of computational ability on a per-computation level. Also, global timing synchronization is typically required. Furthermore, in order to delegate the decryption ability for a number of intervals, the authority must transmit that number of tokens to the recipient.

Other known partition techniques involve so-called "self-delegation," that is, delegation of cryptographic functionality from one entity to itself. An example of such a technique is described in O. Goldreich, B. Pfitzmann and R. L. Rivest, "Self-Delegation with Controlled Propagation—or—What If You Lose Your Laptop," Proceedings of Crypto 1998, pp. 153-168, which is incorporated by reference herein. However, these techniques are generally limited to the self-delegation context, and thus cannot be used to support inter-party delegation.

Another significant drawback associated with the conventional IBE and self-delegation approaches is that the IBE approach is only for decryption, and the self-delegation approach is only for authentication. Thus, neither of these approaches provides a general solution to the problem of partition of cryptographic functionality.

A variety of other techniques are known in the art. For example, U.S. Reissue Pat. No. 36,918 to Micali, entitled "Fair Cryptosystems and Methods of Use," discloses derivation of certain cryptographic keys using a tree structure in order to provide time-bounded eavesdropping capabilities for law enforcement officials.

As another example, U.S. Pat. No. 6,539,092 to Kocher, entitled "Leak-Resistant Cryptographic Indexed Key Update," discloses use of a tree structure to avoid power attacks.

Unfortunately, these techniques fail to address adequately the drawbacks of the above-described IBE and self-delegation approaches to partition of cryptographic functionality.

In view of the various problems and limitations associated with the conventional techniques described above, a need exists for improved techniques for partition of cryptographic functionality.

SUMMARY OF THE INVENTION

The present invention provides improved techniques for partition of cryptographic functionality, utilizing a graph-based partitioning approach.

In accordance with one aspect of the invention, cryptographic functionality characterizable as a graph comprising a plurality of nodes is partitioned so as to permit delegation of at least one of a number of distinct portions of the cryptographic functionality from a delegating device to at least one recipient device. More particularly, a given set of the nodes is associated with a corresponding one of the distinct portions of the cryptographic functionality, and information representative of one or more of the nodes is transmitted from the delegating device to the recipient device such that the recipient device is thereby configurable for authorized execution of a corresponding one of the distinct portions of the cryptographic functionality.

Examples of cryptographic functionality that are partitionable utilizing the techniques of the invention include ability to verify authentication codes or distress codes generated by a hardware-based token, ability to generate authentication codes or distress codes using a hardware-based token, ability to verify a signature, ability to generate a signature, ability to generate one or more values of a one-way chain, ability to perform symmetric cryptographic operations, ability to perform asymmetric cryptographic operations, and ability to derive one or more cryptographic keys.

Advantageously, the partitioning techniques of the present invention overcome one or more of the problems or limitations associated with the conventional techniques described previously.

Another advantage of the present invention is that it provides a particularly efficient mechanism for the provision of cryptographic functionality in accordance with a subscription model.

These and other features and advantages of the present invention will become more readily apparent from the accompanying drawings and the following detailed description.

BRIEF DESCRIPTION OF THE DRAWINGS

FIG. 3 is a flow diagram of an exemplary technique for graph-based partitioning of cryptographic functionality in accordance with the invention.

FIG. 4 illustrates different seed levels associated with different portions of a graph in an illustrative embodiment of the invention.

DETAILED DESCRIPTION OF THE PREFERRED EMBODIMENTS

The present invention will be described herein with reference to an example network-based communication system in which a processing device communicates over a network with one or more other processing devices. It is to be appreciated, however, that the invention is not restricted to use in this or any other particular system configuration.

Additional details regarding certain conventional cryptographic techniques suitable for use in conjunction with the present invention may be found in, e.g., A. J. Menezes et al., Handbook of Applied Cryptography, CRC Press, 1997, which is incorporated by reference herein.

Figure 1:
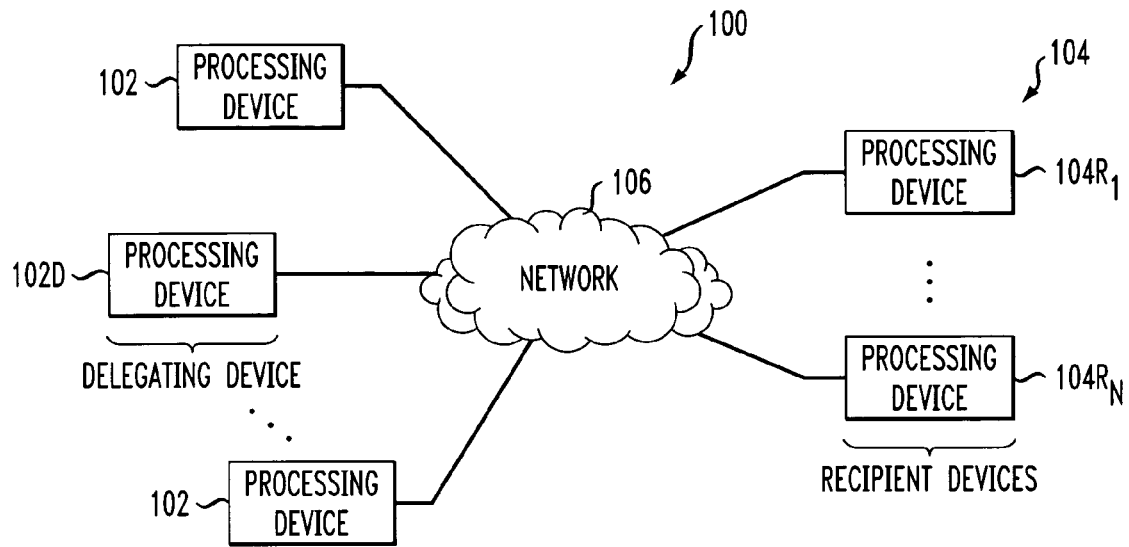
FIG. 1 is simplified block diagram of an example system in which the graph-based cryptographic functionality partition techniques of the present invention may be implemented.

FIG. 1 shows a simplified network-based communication system 100 which will be used to illustrate the graph-based partitioning techniques of the invention. The system 100 includes sets of processing devices 102, 104 configured to communicate with one another over a network 106. A particular one of the processing devices 102 is denoted for purposes of illustration as a delegating device 102D. Similarly, the devices 104 are more specifically denoted as recipient devices $104R_1, 104R_2, \ldots 104R_N$. The denotation of a particular one of the processing devices as a delegating device and others as recipient devices is purely arbitrary. For example, the roles of various pairs of these devices may be reversed in the techniques to be described herein. Also, the particular number of devices shown is by way of example only, and a given system in which the invention is implemented may include more or fewer than the particular number of processing devices shown.

In accordance with one aspect of the invention, the delegating device 102D is configured to implement a technique for graph-based partitioning of cryptographic functionality, as will be described in greater detail below in conjunction with FIGS. 3 through 9.

A given one of the processing devices 102, 104 may represent, by way of example and without limitation, a desktop or portable personal computer, a server, an intelligent network element, a microcomputer, a workstation, a mainframe computer, a wired or wireless telephone, a personal digital assistant (PDA), a television set top box, a "smart dust" element or other type of small sensor, etc., as well as portions or combinations of these and/or other processing devices.

The term "processing device" as used herein refers generally to any information processing device capable of delegating a portion of a cryptographic functionality to one or more other devices or of executing a delegated portion of a cryptographic functionality in accordance with a graph-based partitioning technique as described herein.

A particular processing device or set of processing devices may also be referred to generally herein as a party, and may be associated with a corresponding user, set of users, authority, organization or other entity.

The term "party" should be understood to encompass either a processing device or set of processing devices, a human user or other entity utilizing or otherwise associated with the device(s), or both. An operation described herein as being performed by a party may therefore be performed by a device, a person or other entity utilizing or otherwise associated with the device, or by both the entity and its associated processing device.

The processing devices 102, 104 may be implemented as otherwise conventional processing devices programmed to perform the graph-based partitioning described herein, or as other types of suitably-programmed information processing devices.

The network 106 may represent a global computer network such as the Internet, a wide area network (WAN), a local area network (LAN), a satellite network, a telephone or cable network, or various portions or combinations of these and other types of networks.

Figure 2:
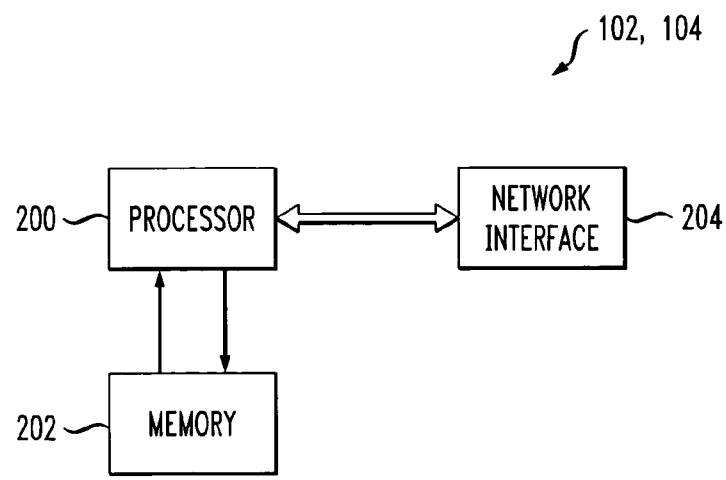
FIG. 2 illustrates one possible implementation of a given one of the processing devices of the FIG. 1 system.

FIG. 2 shows one possible implementation of a given one of the processing devices 102, 104 of the FIG. 1 system. The device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a graph-based partitioning technique in accordance with the present invention can be implemented at least in part in the form of one or more software programs that are stored in device memory 202 and executed by the corresponding processor 200. The memory 202 is also used for storing information used to perform computations or other operations associated with a graph-based partitioning technique of the invention.

As indicated previously, the present invention in accordance with one aspect thereof provides graph-based partitioning of cryptographic functionality.

More specifically, the invention provides techniques for partitioning of cryptographic functionality so as to permit delegation of at least one of a number of distinct portions of the cryptographic functionality from the delegating device 102D to at least one recipient device 104R, where the cryptographic functionality is characterizable as a graph comprising a plurality of nodes. A given set of the nodes is associated with a corresponding one of the distinct portions of the cryptographic functionality, and information representative of one or more of the nodes is transmitted from the delegating device to the recipient device, such that the recipient device is thereby configurable for authorized execution of a corresponding one of the plurality of distinct portions of the cryptographic functionality.

In an illustrative embodiment to be described in conjunction with FIGS. 3 and 4, the nodes of the graph correspond generally to seeds arranged in different levels.

Referring now to FIG. 3, in step 302 the delegating device 102D transmits one or more seeds associated with a particular portion of the partitioned cryptographic functionality to a given recipient device 104R. The recipient device in step 304 utilizes the transmitted seed or seeds to compute one or more additional seeds which permit authorized execution of the particular portion of the partitioned cryptographic functionality by the recipient device. Alternatively, the recipient device could utilize the transmitted seed or seeds directly, without computing any additional seeds.

The seeds are configured in accordance with a graph-based representation, to be described below, which ensures that the given recipient device cannot execute the particular portion of the cryptographic functionality until it receives the appropriate transmitted seeds. Also, other parties will not be able to execute the particular portion of the cryptographic functionality, unless they too are supplied with the appropriate seeds.

An example application for the graph-based partitioning techniques of the invention is in providing subscriptions to particular types of cryptographic functionality. As a more particular example, the invention allows delegation of the ability to verify or generate access codes, such as those produced by an RSA SecurID® hardware-based user authentication token commercially available from RSA Security Inc. of Bedford, Mass., U.S.A. These and other applications will be described in greater detail elsewhere herein.

Seed derivation techniques that can be used to delegate the appropriate seed information from the delegating device 102D to a recipient device 104R will now be described with reference to FIG. 4.

Consider a sequence of seeds to be given out in an illustrative embodiment. Let us denote these by $v_{1,1}, v_{1,2}, \ldots v_{1,n}$, where n is the total number of seeds. One way of organizing these seeds is to organize them in terms of tuples of $t_1$ seeds, letting the ith seed of the jth tuple be computed as $f_1(j, i, v_{2,j})$, where $f_1$ is a function, and typically a one-way function, and $v_{2,j}$ is a seed from which some of the previously mentioned seeds are derived. Thus, we have two levels of seeds, where the first number of the subscript indicates the level. It is to be appreciated that this particular organization is merely an example, and should not be construed as limiting the scope of the invention in any way. Other embodiments could use other organizations, including, again by way of example, one in which the function $f_1$ and other similar functions are not dependent upon the tuple index j, but are instead dependent only on the seed index i and the next-level seed.

Now let the second-level seeds be organized in tuples of $t_2$ seeds, where the ith such seed of the jth such tuple is computed as $f_2(j, i, v_{3,j})$, where $v_{3,j}$ is a third-level seed. Here, $f_2$ is a function, and typically a one-way function, and may be the same function as $f_1$, or selected from the same class of functions as $f_1$, or selected independently. Similarly, $t_1$ and $t_2$ may be the same number, or may be different numbers. Also, different values of $t_1$ and $t_2$ may be used within one and the same level, but this is not done in the FIG. 4 example for clarity and simplicity of illustration.

It should also be noted that it is possible to use two or more different functions $f, f', f''$, etc. on the same level. However, it may be preferable to use the same function throughout the various levels. A more particular example of a function suitable for use with the present invention is a function selected using a so-called "salt" value. More specifically, such a function may be given by $f(x)=h(s, x)$, where h is a hash function, and s is the salt value. Another possibility is the function $f(x)=\text{trunc}(h(s, x))$, where trunc is a function that truncates its input to a certain desired size, e.g., 64 bits. Of course, the invention does not require the use of these example functions or any other particular function.

The above-noted salt values are generally publicly available at the time of function evaluation, and may be used in a manner similar to their conventional use for storage of password files on non-secure computers.

Assume that there are a total of L levels of seeds organized in the manner described above, where $v_{L,1}$ is the seed that generates all the other seeds by one or more function applications. Such an arrangement is illustrated in FIG. 4. Each of the seeds of the FIG. 4 arrangement may be viewed as a node of an example graph, the graph being in the form of a tree with one or more nodes at each of the L levels of the tree.

If the delegating device 102D sends the seed $v_{L,1}$ to the recipient device 104R, this enables the recipient device 104R to generate all the seeds mentioned above, and in particular, all the seeds in the sequence $v_{1,1}, v_{1,2}, \ldots v_{1,n}$. However, if delegating device 102D sends $v_{L-1,1}$ to the recipient device 102R, this only lets the recipient device generate a fraction of these seeds, where the fraction is the first $n/t_{L-1}$ elements, and where $t_{L-1}$ is the number of tuples of the (L−1)th level. Similarly, if the delegating device 102D sends the recipient device 104R the value $v_{L-2, 2}$, this enables the recipient device 104R to generate some smaller fraction of the seeds of the first mentioned sequence, namely $k=n/t_{L-1}t_{L-2}$ seeds starting with the seed $v_{k+1}$.

Therefore, the smaller the index i is of the seed $v_{i,j}$ that is given to the recipient device 104R, the fewer of the seeds in the sequence $v_{1,1}, v_{1,2}, \ldots v_{1,n}$ that this party can generate. Moreover, the larger the index j of the same seed $v_{i,j}$, the further towards $v_{1,n}$ are these generatable seeds. It can be seen that if the delegating device 102D sends the recipient device 104R a collection of such "interior" seeds, that is, seeds whose first index is not 1, then the recipient device 104R can compute a set of seeds on level 1 corresponding to the union of all the seeds that party could have computed from the individual interior seeds.

The above-described seed derivation techniques can be implemented using a graph structure other than one having the exemplary tree structure of the FIG. 4 arrangement. For example, the graph may be an arbitrary acyclic graph with at least one node serving as a root, also referred to herein as a parent node. Thus, it is possible to construct the graph so that some set of seeds on some level, including level 1, are used to derive some other set of seeds, where the latter may be on other levels or the same level. It is also possible to require more than one interior seed to generate a given dependent seed. For example, if the function used to compute a seed requires two seeds, and their indices, as input, then it is necessary to know these values in order to compute the dependent value.

A useful application of the above-described exemplary graph-based partitioning structure is as follows.

Consider a set of rooted trees of the type described above, but with the modification that each such tree starts at some level L and ends at level 2. Then, instead of the seeds on level 1 being computed from only seeds of the same tree, as in the description above, each of the level-1 seeds is determinable using seeds from two or more of the trees. For example, the first seed $v_{1,1}$ may be a function of the seed $v_{2,1}$ of the first tree and a seed of the second tree. A more particular example will be described below in conjunction with FIG. 9.

It is therefore possible that one tree, or a portion thereof, can be given to a first party, and another tree, or a portion thereof, can be given to a second party, the first and second parties corresponding to different recipient devices. These two parties would be able to compute the level-1 seeds only for those indices for which they together can compute all the required inputs.

Note that the first and the second party may alternatively correspond to the same recipient device, and that the foregoing technique may be used to restrict what seeds are delegated beyond the control of these parties.

Note also that the branching factors of the different trees involved may be different from each other, and that one of the leaves of one tree may be used to compute more level-l seeds than the leaves of another. Advantageously, this allows one to customize the granularity with which the cryptographic functionality is delegated.

An example of an embodiment of the invention involving multiple recipient devices may comprise a separation of an otherwise conventional RSA SecurID® authentication token across two or more devices. More specifically, in a two-device embodiment of this type, a given one of the devices may be a mobile telephone, a PDA or other device having a display screen. Such a device may not be entirely secure, e.g., it could potentially be attacked by a virus. The other device does not have a screen, and may be an ID card, a security badge or pendent, or other similar device. The two devices both store one or more "long-term" seeds for a particular level or levels of the tree, and then exchange values for each time unit, authentication, or combinations thereof. The exchanged values may be seeds that are descendants of the above-noted long-term seed(s). Such an arrangement safeguards the long-term seed(s) of the two devices against attack. Also, if the corresponding user loses the second device, the security of the authentication token is not entirely compromised. Numerous variants on this embodiment are possible. For example, it is possible for only the second device to store the long-term seed, with the first device periodically receiving short-term seeds. Also, the devices need not be capable of communicating directly with one another, but may instead utilize a common interface, such as a smart card reader with wireless capability.

The two devices in the foregoing example may collaborate to perform a cryptographic verification function, or may collaborate to perform a cryptographic generation function. Also, the techniques can be readily extended to involve more than two devices.

It should be noted that in an arrangement of the type described in conjunction with the foregoing example, in which only the second device stores the long-term seed, the second device may be configured to have a very limited use. It preferably cannot run arbitrary programs, or receive commands or requests. Instead, it simply outputs appropriately encrypted seeds for the other device with some given frequency. This can be done using wireless communication links, such as links compliant with the Bluetooth or IEEE 802.11 standards, or other suitable communication channels. The first and second devices in this and other arrangements may alternatively comprise, again by way of example, a first "well-guarded" computer and a second computer that runs normal applications.

A related example is one in which two servers collaborate to perform a cryptographic verification function for a modified RSA SecurID® token. In this example, the RSA SecurID® token stores two long-term seeds from which additional seeds are derived via the techniques of this invention. This is similar to the arrangement shown in FIG. 6, to be described below, except that the two long-term seeds in the present example need not be derived from a yet higher-level seed. One of the long-term seeds is stored at each of the servers. One server delegates seeds derived from its long-term seed to the other server. In this way, only the recipient server can perform the verification function for the RSA SecurID® token, yet with better protection against compromise because it receives only short-term seeds from the other server. Many different graph structures are possible including simple graphs where the recipient server combines its long-term seed directly with the short-term delegated seed it receives.

Another type of graph that may be utilized in implementing the techniques of the invention is a hash chain or one-way chain. This is a type of graph in which a given seed $v_i$ is computed from seed $v_{i+1}$ by application of a function, typically a one-way function, and where seed $v_n$ is the "root" of all the other seeds. Techniques for efficiently generating values associated with such a graph are described in International Patent Application Publication No. WO 02/084944 A1, published Oct. 24, 2002 and entitled "Methods and Apparatus for Efficient Computation of One-Way Chains in Cryptographic Applications," which is incorporated by reference herein.

For example, the above reference discloses a technique which generates the sequence of seeds starting with $v_1$ and ending with $v_n$ while storing only a fraction of the seed values at any given time, and while performing only a limited number of computations for each seed that is to be generated.

The delegating device 102D in FIG. 1 can delegate the knowledge of some portion of a one-way chain by sending to the recipient device 104R one or more seed elements representing the sub-chain. If the root of the sub-chain is sent, this allows the generation of all subsequent seeds of the chain. If in addition more seeds within the sub-chain are sent, and these are positioned in accordance with the technique described in the above-cited reference, this allows the recipient device to generate the sequence of seeds in the sub-chain in a particularly efficient manner. One may also delegate portions of the chain. For example, the seed value that is delegated need not be the root, but could instead be another value in the chain.

It is also possible to combine such a chain with other graph structures. A useful construction may be to consider the above-mentioned chain as existing in a first level, such that the computed seeds are those that are used in the application. Another useful construction may be to let the above-mentioned chain exist in a second level, and let the ith seed of the first level be derived from the ith seed of the second level, where this derivation is performed by means of applying a function and preferably a one-way function. Yet another construction that may be useful is to combine the above mentioned chain with a tree, in accordance with the previous description relating to combination of multiple trees.

Delegation techniques in accordance with the invention may also involve the erasing of particular seeds after their use. For example, consider an arrangement in which a first party A delegates cryptographic functionality to a second party B by means of a first set of seeds denoted Set 1. Instead of storing Set 1, B can store a larger number of seeds that are descendants of Set 1, or some subset of these. Then, after B has used one of these seeds, B can erase that seed. If Set 1 is not stored, the used and erased seed would not be accessible by an attacker. Nonetheless, B would still have a second set of seeds, denoted Set 2, that are derived from Set 1, thereby enabling the computation of the remainder of descendant seeds, i.e., those seeds of Set 1 that are not yet used. This arrangement may be viewed as a self-delegation embodiment of the invention, in which a delegated set of seeds is replacing a previously stored set from which the delegated set is computed. Its benefits are attributable at least in part to the fact that the seed derivation process in this embodiment is non-reversible.

A number of illustrative examples of graph-based partitioning of cryptographic functionality in accordance with the invention will now be described with reference to FIGS. 5 through 9. Each of the figures shows an example of a graph characterizing cryptographic functionality partitioned in accordance with the techniques of the invention. In each of the graphs shown in these figures, nodes are represented by circles and arrows between nodes indicate the directions of possible derivation.

Figure 5:
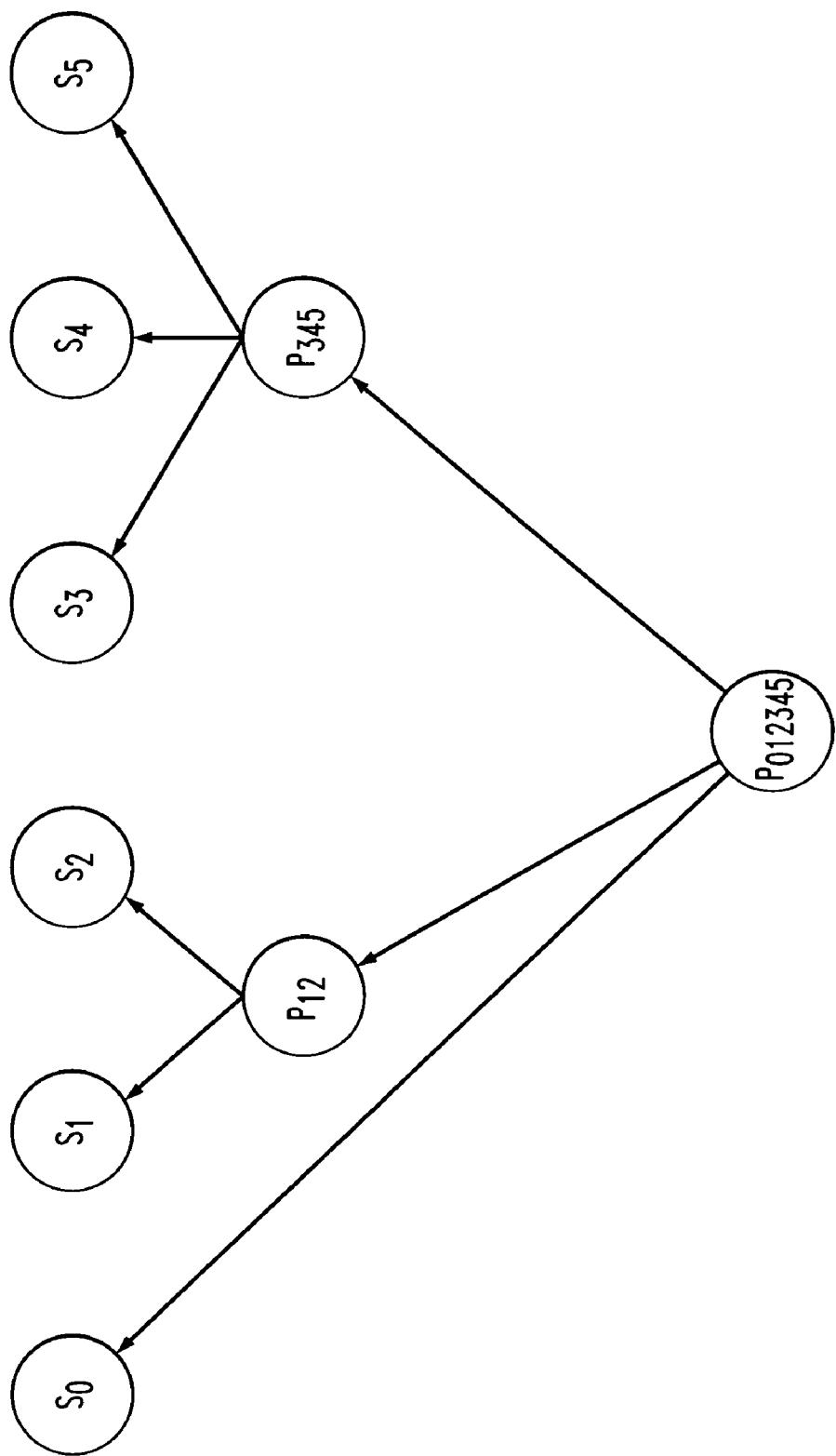
FIGS. 5 through 9 show illustrative examples of graph-based partitioning of cryptographic functionality in accordance with the invention.

Referring initially to FIG. 5, the graph shown is in the form of a tree and comprises a set of nodes including a root or parent node $P_{012345}$, intermediate level nodes $P_{12}$ and $P_{345}$, and a number of leaf nodes. The leaf nodes of the tree comprise a set of seeds $S_0, S_1, S_2, \ldots S_5$, and the structure of the tree illustrates how these seeds may be derived from other nodes of the tree based on a partitioning of the cryptographic functionality. For example, the node $P_{12}$ can be used to derive seeds $S_1$ and $S_2$, but no other seeds.

In order to delegate the cryptographic functionality associated with the seed $S_1$ only, the seed $S_1$ is sent to the recipient device. However, to delegate the cryptographic functionality associated with seeds $S_1$ and $S_2$, either the seeds $S_1$ and $S_2$, or the node $P_{12}$, can be sent to the recipient device.

Figure 6:
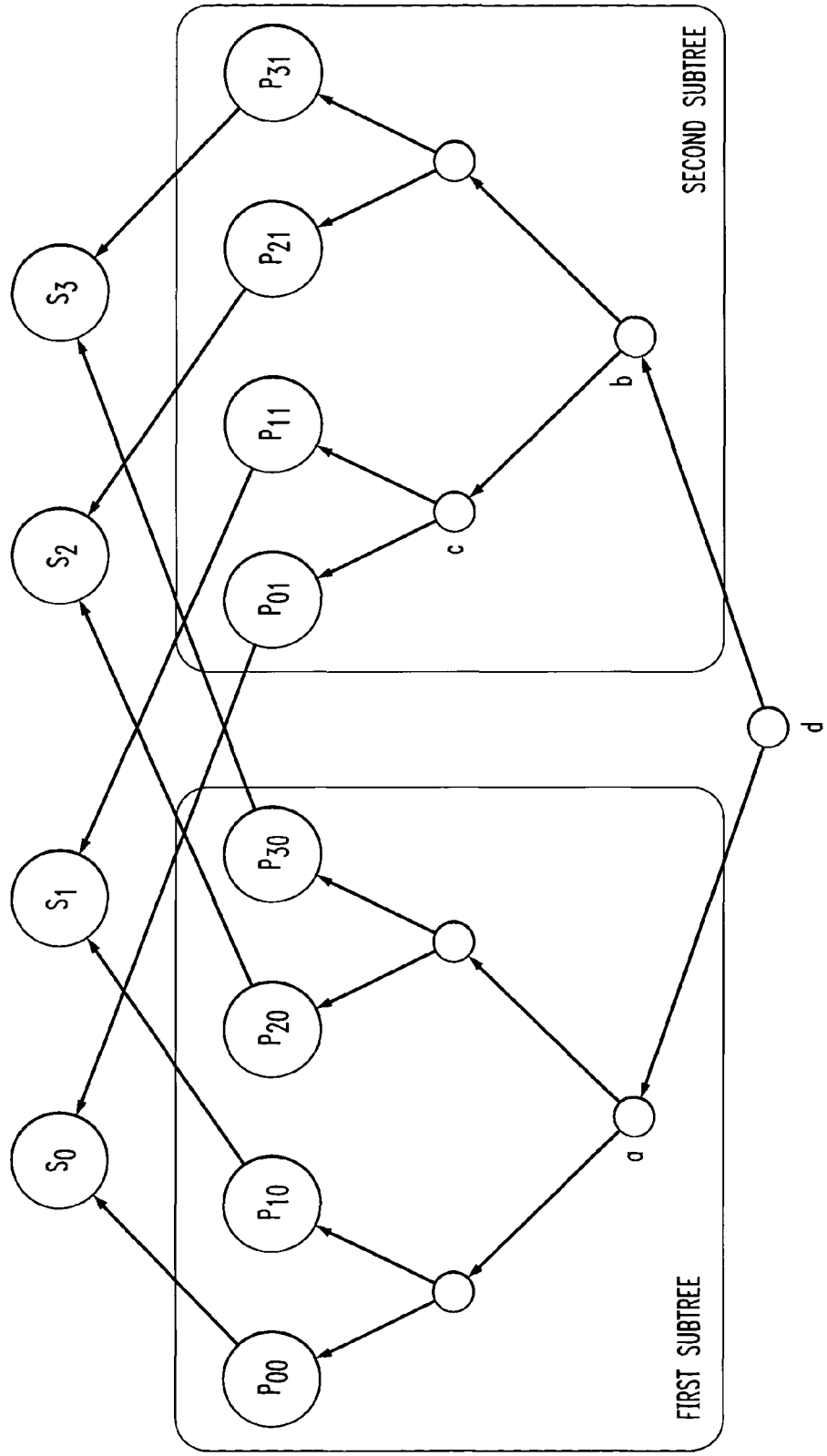

FIG. 6 shows another example graph, in the form of a tree having first and second subtrees each associated with distinct portions of the cryptographic functionality. The root nodes of the first and second subtrees are denoted a and b, respectively. The root node of the graph is denoted d. An authority may have node d, and give node a to a first party and node c to a second party. These two parties together can generate the seeds $S_0$ and $S_1$, but not $S_2$ or $S_3$, since two inputs are required to compute the S-values. Given the node b, the second party can aid in the computation of $S_2$ and $S_3$.

Figure 7:
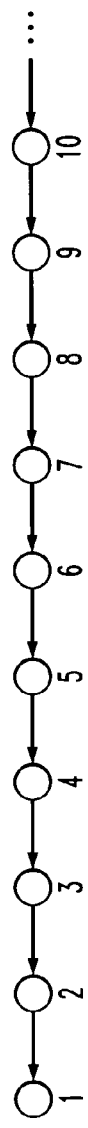

Referring now to FIG. 7, an example of a graph in the form of a chain is shown. Knowledge of node 10 allows computation of nodes 1, 2, . . . 9. If a party is given node 8, that party can compute node 1 to node 7. If given nodes 1, 2, 4 and 8, that party can compute the remaining nodes in the set comprising node 1 to node 7, but in fewer operations per node, and thus more efficiently.

Figure 8:
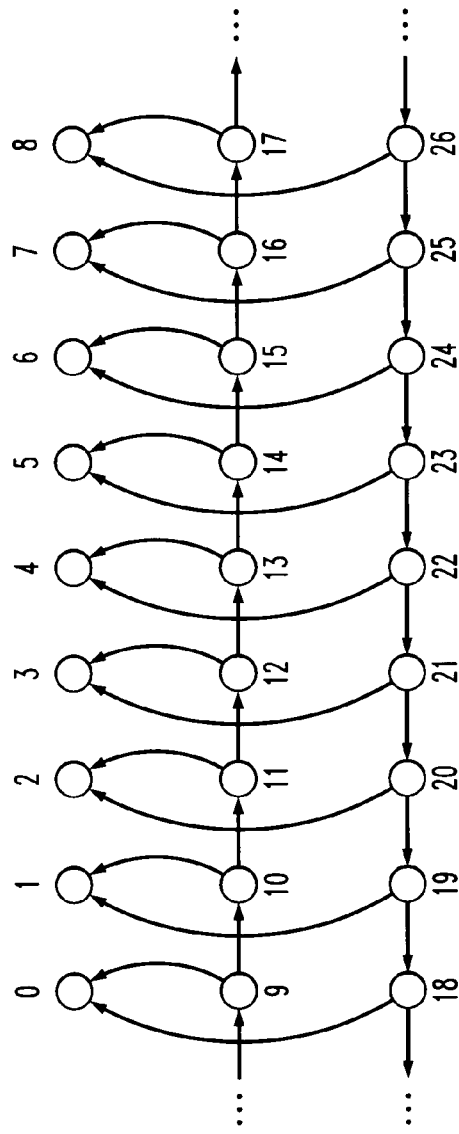

FIG. 8 shows an example of a graph in the form of multiple interconnected chains. Given nodes 11 and 23, a party can compute nodes 2, 3, 4 and 5, but not nodes 0, 1, 6, 7 or 8. As in the FIG. 7 example, more nodes can be given for more efficient computation.

Figure 9:
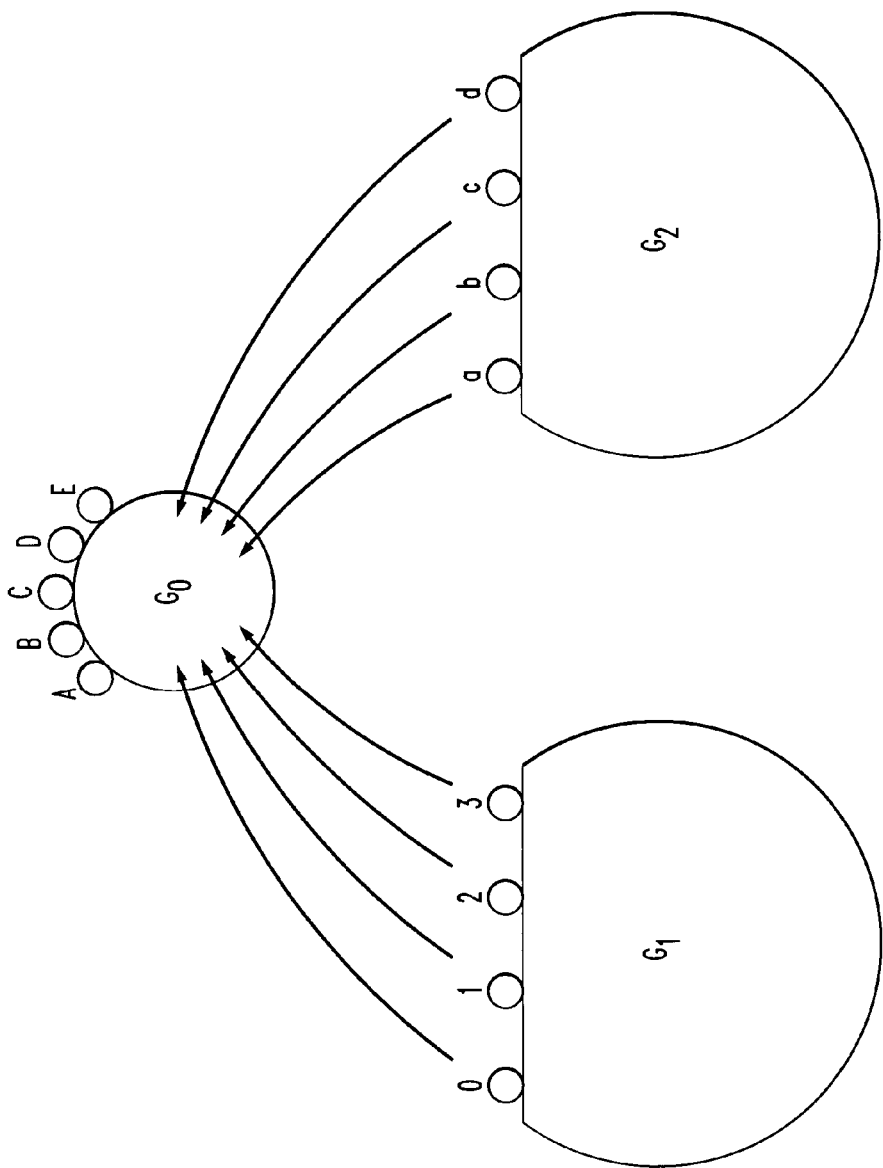

FIG. 9 shows an example graph comprising multiple graphs denoted Go, $G_1$ and $G_2$. The graphs $G_0$, $G_1$ and $G_2$ each may represent, for example, a particular one of the graphs described in FIGS. 5 through 8, and may be the same as or different from one another. In accordance with the invention, given certain nodes of $G_1$ and $G_2$, a party is thereby enabled to compute certain of the named nodes 0, 1, 2 and 3 or $G_1$ and a, b, c and d of $G_2$, from which some of the nodes A, B, C, D and E of graph $G_0$ may be computed.

It is to be appreciated that the example graphs shown in FIGS. 5 through 9 are for purposes of illustration only, and their particular structures should not be construed as limitations of the invention.

As indicated above, the graph-based partitioning techniques of the present invention are suitable for use in a wide variety of cryptographic applications. More particular examples of these applications will now be described.

Delegation of the Ability to Verify or Generate RSA SecurID® Authentication Codes One application of the techniques of the invention is in delegating the ability to verify or generate authentication codes associated with the above-noted RSA SecurID® user authentication token. An RSA SecurID® token is a device that outputs sequences of strings of characters, where for each time unit one particular character string is output. The output may be presented on a screen, transmitted by wireless or wired means, or otherwise communicated to a secondary device or a human entering the string into a secondary device. The secondary device then communicates to an authenticating server a transcript that is a function of this string. The server verifies whether this is a valid transcript for the corresponding time interval, potentially taking other environmental factors into consideration. If the transcript is judged to be valid, some access is granted to the user in possession of the RSA SecurID® token; otherwise, permission may be withheld. Thus, the token outputs are like temporary passwords that cannot be guessed by an attacker, with other than a negligible probability.

The RSA SecurID® token typically contains a single secret master seed, from which multiple secret seeds are derived. The above-noted sequences of strings are computed using such a set of secret seeds, without which the strings cannot be computed. The authenticating server performing the verification of the transcript requires access to some set of seeds associated with the token in question. Currently, such servers have access to the same set of secret seeds that the token uses to generate its output.

In accordance with an aspect of the invention, by appropriate partition of the seeds, and corresponding use of the same, it is possible for an authority to grant a server the ability to perform the verification by giving it access to the appropriate portion of secret seed information. However, by giving access to only those portions of the secret seed information necessary to verify outputs for a particular time period, the authority can prevent the server from being able to verify outputs before or after this time period.

This results in several benefits. First, the authority can give servers access to seeds according to a subscription model in which the servers pay a fee based on what time intervals they require seed information for, and for what users. This would allow for a better charging model than an alternative flat charging model, allowing servers wishing to verify outputs during shorter periods of time to pay less than servers wishing to verify outputs during longer periods of time. It also provides better control of seed information, preventing extended damage arising from temporary intrusions by hackers, viruses, and other unwanted leaks of seed information. This, in turn, improves the security for all users of the tokens, as the potential leakage of seed information could otherwise in certain situations be used to create clones of their tokens or associated devices.

One possible alternative subscription model is one in which there is no particular charge per computation, but there is instead a per-seed charge without regard to the number of times a given seed is used.

Numerous other types of subscription models can be used in implementing the invention, and such models will generally require compliance with at least one specified criterion before a seed or other information representative of one or more nodes in a graph-based partitioning of cryptographic functionality is transmitted from a delegating device to a recipient device. Compliance with the specified criterion may be satisfied, for example, upon receipt of a designated payment, where the term "payment" in this context is not limited to monetary payment, but may alternatively include information or any other item presentable in exchange for the delegated information.

A more detailed example of the above-described delegation of the ability to verify RSA SecurID® authentication codes will now be presented.

In this example, it is assumed without limitation that the seed derivation is performed utilizing a master seed value S from which a yearly seed SY is derived. This in turn is used to derive a monthly seed SM, which is used to derive a daily seed SD, which is used to derive an hourly seed SH. The hourly seed SH and a 30-second increment timer are used to compute the current output of the device. A verifier needs to know SH and the time interval. It can then compute the expected output and compare that to the received output. The latter may be combined with a personal identification number (PIN), which is also verified at the same time or separately.

In order to provide seed subscription to the verifier in this example, the verifier is not given the master seed S, but is instead given a different seed, such as SM. This would allow the verifier to compute all seeds "below" SM, that is, the daily and hourly seeds, for the associated month. Alternatively, multiple SM values can be given at the same time, or various combinations of one or more SM values, one or more SD values, or other values. More specifically, to give a 50-day subscription, assuming a 30-day month, one SM seed and 20 SD seeds may be given to the verifier.

A similar approach can be utilized to provide seed subscription for a user of the authentication token. For example, the user can store the master seed S on a secure device at home, and then generate SD seeds for particular days, the latter being stored on a portable device for use when traveling. If the portable device is lost, the damage is limited to the days corresponding to the particular SD seeds stored on it.

Although this example utilizes a tree structure based on actual calendar time, such as months and days, numerous other such structures may be used. One alternative structure is one based on powers of two of minutes, such as 2 minutes, 4 minutes, 8 minutes, 16 minutes, etc. The invention is not restricted with regard to the particular interval or set of intervals that are used. Generally, any set of interval sizes can be used, and nested in an arbitrary manner.

Another example involving delegation in the context of the RSA SecurID® token will now be described. Such a token is commonly utilized to allow a user of a first computer to authenticate himself or herself to a second computer, where these two computers are connected by a network, and where the latter computer typically is associated with some resource, such as the user's account. Another use of the token would be to allow the user to authenticate himself or herself to the first computer, such as during a login phase. In this latter use, the first computer would not necessarily be connected to the second computer, but would be able to verify the correctness of the token code offline. This is a beneficial alternative to static passwords in the context of logging in to a laptop or desktop computer. However, as the ability to verify token codes typically allows the generation of the same token codes, this setting may lead to a significant drawback associated with the loss or theft of the first computer. That is, an unauthorized person able to read the contents of the first computer would be able to derive token codes associated with the user's token. That, in turn, would allow the unauthorized person to pose as the user to another machine, such as the second computer mentioned above. The present invention advantageously allows the delegation of RSA SecurID® token seeds, and of the computational ability associated with the corresponding token codes. Thus, if the first computer only carries a seed that can be used to derive token outputs for some limited period of time, the loss or theft of this computer would only correspond to the potential compromise of token codes for this limited period of time. The first computer may occasionally update the seeds it carries by communication with a second computer carrying a master seed or other higher-level seed, thereby preventing the first computer from "depleting" its seed data while avoiding the compromise of long-term seeds.

The above-described verification or generation ability delegation aspect of the invention, although illustrated in conjunction with the RSA SecurID® token, is applicable to other types of tokens or similar cryptographic elements.

It is also possible for this aspect of the invention to be implemented as a form of self-delegation. For example, a first server within an organization may delegate abilities to another set of servers within the same organization in the manner described above. In this case, the benefits are primarily those associated with limited disclosure of long-term secrets, namely, security against break-ins.

Delegation of the Ability to Verify or Generate Distress Codes

U.S. Provisional Patent Application Ser. No. 60/429,754, filed Nov. 27, 2002 and entitled "Identity Authentication System and Method," which is incorporated by reference herein, discloses techniques which involve use of different seeds of a token, such as an RSA SecurID® token, depending upon the occurrence of particular events. For example, one seed may be used given that a certain event occurred, and another seed may be used given the occurrence of another event. One of these events may be that no noteworthy event occurred; another may be that an attempt to break open the device took place. Further events may be signaled by means of further seeds, and such events may include, for example, low battery power, an imminent device malfunction, or other important events. These signaling seeds are generally referred to as "distress codes." As is described in the above-cited application, an attacker will generally not know what seed should be used for a given time period, even if the attacker is able to monitor previous transcripts from the token. Thus, the attacker cannot forcibly select a particular seed to be used, in order to suppress the signaling from the token.

In such an arrangement, the authenticating server performing the verification of the transcript needs to know what seed will be used by the token given a certain event. It can then determine what event was registered by the token by comparing the received transcript to what would have been generated given the use of various seeds by the token. If the server does not know what seeds correspond to what events, it will not be able to determine what event was registered by the token, but will still be able to verify that the transcript was produced in a way that involved a given token. Therefore, it would still be able to use the resulting transcript instead of a password, but would not have the additional benefit of being able to monitor the events occurring at the token in question.

The information regarding what seed corresponds to what event is determined by computation on a so-called selector seed, which may itself comprise a set of seeds.

In accordance with an aspect of the invention, such a set of seeds can be partitioned so that different seeds correspond to the selection of seed, based on event, for different time periods. This allows an authority with access to the set of seeds to send a selected subset of these seeds to a verifier, allowing the verifier to derive the event status of the corresponding token for the corresponding time intervals. Again, this value-added service can be performed on a subscription basis, where an authenticating server can subscribe to such information for arbitrary time periods. This also provides a security enhancement in the face of potential attacks on the server.

In an alternative embodiment, there would not be different seeds to signal the occurrence of different events, but instead a fixed set of seeds manipulated in a way that signals what events were detected. Thus, the modification of the seeds will result in a modification of the resulting cryptographic computation, and the results thereof. These changes are preferably not noticeable by an observer who does not know the state of the device, but would be noticeable by an observer that does know the state of the device. Typically, a verifying server, such as an ACE server, would know the expected state of the seeds of a given device, and would therefore be able to determine whether these must have been modified, given the output computed from the seeds, and if so, what event was detected by the device generating the output.

Other embodiments of the invention may be configured to implement self-delegation of the ability to verify distress codes, through straightforward modification of the above-described techniques. Similarly, other delegation techniques described herein may be configured so as to implement self-delegation.

Signature Generation Using Merkle Trees

A Merkle tree is a type of graph in the form of a rooted tree, where a parent node in a given set of nodes is associated with a value that is a one-way function of the values associated with the child nodes of that parent. Thus, the root value is a function of all the leaf values of the tree. The leaf values may be generated using a pseudo-random generator indexed by the number of the leaf, which is the standard approach if one does not want to store all of the leaf values. A Merkle signature corresponds to a block of leaves, where a pattern of the values of these leaves or their preimages is revealed, and where the exact pattern encodes the message or a digest of the message to be signed. In addition to these values, all values that are siblings on the path from these nodes and to the root of the tree are output.

Given such a collection of values, it is well-known how to verify the correctness of the signature by re-computing the root value given the leaf, leaf pre-image and sibling values, and comparing the given result with the known root value. If these two values are equal, then the signature is considered valid, and otherwise not. A Merkle signature in this implementation can only be computed by a party who can compute the leaf values and their preimages. Alternative implementations may use leaf values instead of pre-images, as would be readily appreciated by one skilled in the art.

In accordance with an aspect of the invention, the generation of Merkle signatures can be delegated from a first party to a second party by sending information that allows the generation of the related leaf values, and/or preimages thereof.

Trivially, the first party could send the second party the same secret value from which the first party derives all leaf values. This, however is a delegation of all computation, which may be more delegation than is desirable. Similarly, the first party can send the second party all the values needed to generate one signature, potentially a signature unknown to the first party. This requires a large quantity of communication.

An alternative approach, utilizing the techniques of the invention, is to send a small number of values from which one or more signatures can be generated, where the first party has control over the number of signatures the second party can generate. This can be done by constructing what may be viewed as a "mirror" tree below the Merkle tree. The root of the mirror tree is the seed used to compute the entire mirror tree, its left child is the seed used to compute the entire first half of the mirror tree, and so on, and the leaves of the mirror tree are used to compute the leaf pre-images of the Merkle tree. Thus, in the mirror tree, each node other than the root is a one-way function of its parent, and left and right children are different such one-way functions. One possible variant is one in which the leaves of the mirror tree are equal to the pre-images of the Merkle tree, or are used to compute some set of these.

Another example involving the use of two separate tree structures is as follows. A first one of the tree structures, denoted A, is one for which the root is a master seed and the leaves are seeds, configured such that the value of a node is derived from the parent of the node. The second tree structure, denoted B, is a Merkle tree in which the leaves are functions of the leaf seeds of A, configured such that the values of the nodes are functions of the values of the children, and the root is the public key. Thus, signatory ability can be delegated by supplying appropriate values of A. It is possible to restrict the verification ability by ensuring that the root of B is not made public. Certified nodes of B may then be given to the verifier, thereby allowing the verifier to verify associated signatures.

Generation of Hash Preimage Chains

A one-way chain, such as a hash chain, is a sequence of values, where a first value, also referred to as a seed value, is used to generate a second value, which in turn is used to generate a third value, and so on. A given value is generated by applying a one-way function, such as a hash function, to its predecessor. There are many applications where releasing the values in opposite order is beneficial. Here, one would first release value number n, for some n, after which one would release value number n−1, followed by value n−2. If value n+1 has been published during a setup stage, as a later value is released, a recipient can verify the correctness of the later value by applying the one-way function to this value and comparing the result to the known value.

There are several ways of maintaining and generating a sequence of outputs of this type. One trivial way is to store all the values and look them up when needed. Another trivial way is to compute all values from the stored seed value when needed. More efficient techniques are described in the above-cited International Patent Application Publication No. WO 02/084944 A1. For example, a technique described therein allows a party to generate the sequence of values to be output or otherwise used while storing only a small number of values which are periodically updated using a limited amount of computation.

In accordance with an aspect of the invention, it is possible to delegate the generation of one-way chain values of the type described above. For example, a first party can send some information to a second party, allowing the second party to construct and output the values needed. For example, by giving the second party the (n/2)th value, the second party will be able to generate all values from position n to n/2, but not values between n/2−1 and the seed value. Similarly, by giving the second party some set of values derived from the efficient technique mentioned above, this allows the second party to efficiently compute the values of the associated interval.

Delegation of Symmetric Encryption/Decryption Abilities

Symmetric encryption techniques, such as DES and AES, take as input a secret key and either a plaintext or a ciphertext, and produce either a ciphertext or a plaintext, depending on whether the technique is run in an encryption mode or a decryption mode. Typically, a pair of users would establish a shared secret key by means of asymmetric key exchange protocols, and use this key for some number of interactions, after which it is replaced by another key.

The techniques of the present invention may be used to deliver key seeds to two or more communicating parties by a key generating party, who may be one of the communicating parties. More particularly, the key generating party selects a seed, from which that party computes seeds associated with intervals of time or other events. These derived seeds can be distributed to other parties, enabling them to encrypt and decrypt information.

The delegation of symmetric encryption/decryption abilities in accordance with the invention thus involves utilizing the seeds, or portions or functions thereof, as keys.

One scenario in which this approach is particularly relevant is for broadcast encryption, where a data source encrypts and broadcasts data to a set of receivers, and only registered receivers should be able to decrypt the communication.

Another application of the type of delegation is in the context of Bluetooth or other wireless networking protocols. A given network may be configured to include a master device that stores a long-term seed, and a set of slave devices. Each of the slave devices is a member, for a certain period of time, of a "piconet" or other group of devices run by the master device. The period of time may be of any desired duration. The master device can give the various slave devices different seeds or different longevity at required intervals. If a slave device leaves the group, re-keying of the remaining devices is not necessary. Such an approach is applicable not only to delegation of symmetric encryption/decryption abilities, but also to delegation of message authentication or other cryptographic functionality.

Delegation of Asymmetric Cryptographic Operations

There are two common asymmetric pairs of cryptographic operations, namely encryption/decryption and signing/verification. While overlap between these two pairs of operations is only apparent for some algorithms, such as the well-known RSA algorithm, it is still the case that the type of keying material is related between the pairs. One possible type of key pair is that based on the Diffie-Hellman problem, i.e., where a secret key is a value x from some set of values $[0 \ldots q-1]$, where q is a prime number, and the corresponding public key y is the quantity $g^x$ modulo p. Here, p is a prime of the form $p=kq+1$ for some value k, and g is a generator of a group G of size q. It is well known that cryptosystems based on keys of this type can be made secure based on the believed difficulty of computing discrete logs, meaning to compute values such as x from public information containing values p, q, g and y.

One example of an encryption scheme using this type of key pairs is the El Gamal cryptosystem, described in the above-cited A. J. Menezes et al. reference. In this cryptosystem, a first party encrypts a message m in a field G by selecting a random number c from $[0 \ldots q-1]$ and computing (a, b)=$(y^c m, g^c)$, where all operations are modulo p. Such a pair (a, b) is decrypted by computation of $a/b^x$. Examples of signature techniques using such key pairs include Schnorr and DSA signature techniques, both described in the above-cited A. J. Menezes et al. reference.

The techniques of the present invention make it possible to delegate the ability to decrypt and sign by sending a seed value to a party, from which decryption keys or signing keys $X=\{x_1, x_2, \ldots\}$ could be computed. The corresponding public keys $Y=\{y_1, y_2, \ldots\}$ could be disclosed beforehand, or when needed, and either by the delegating party or another party. A given key $y_1$ would be computed from the key $x_i$ as is normal. We note that if the key $y_1$ is not made public but only revealed on a per-need basis, it is still possible to delegate one of the signatory ability, the verification ability, the decryption ability and the encryption ability.

It is to be appreciated that the techniques of the invention can be combined with standard methods for threshold computation, allowing the abilities to be granted to a set of participants, so that at least a quorum of some preset size would need to collaborate in order to perform the delegated actions.

In a second setting relating to asymmetric operations, one can delegate seeds from which the public keys can be directly derived. The corresponding set of secret keys would then be derived by an authority with this ability, and delegated to the appropriate parties. This construction is therefore particularly relevant to a cryptosystem that is identity based, such as the above-noted IBE. This allows the delegation of information related to both public and secret keys, with benefits as described above.

Note that a given public key/secret key pair is generally reusable for multiple transactions, while symmetric keys may or may not be so configured.

Advantageously, the graph-based partitioning techniques disclosed herein overcome one or more of the problems and limitations associated with the above-described conventional techniques.

For example, the techniques of the invention in an illustrative embodiment permit delegation on a per-computation rather than per-interval basis, and thus do not require a third party to know the particular intervals or segments into which computational ability has been partitioned, nor do they require a separate transmission for each interval.

It should be appreciated, however, that the present invention can also be implemented using time-based arrangements in which a given seed can be used multiple times, such as that previously described herein in conjunction with the asymmetric encryption example. In that example, one public key can be used any number of times, but may nonetheless be associated with certain events, after which a new public key is deployed. Such events may be publicly observable, or may be associated with an attack of the previously used key, a revocation of the same, etc.

Moreover, the described techniques allow the delegation of both public key and symmetric key operations, as well as other operations not encompassed by either of these general types of cryptographic computation.

Another important advantage of the present invention is that it provides a particularly efficient mechanism for the provision of cryptographic functionality in accordance with a subscription model, as was described above.

It should be noted that the techniques of the invention can be combined with existing conventional techniques such as IBE, or other techniques where partition of cryptographic functionality is tied to time intervals. Such a combination provides improved control over delegated cryptographic functionality in terms of both the associated time interval and the individual cryptographic operation(s) to which it corresponds. For example, this could allow an operation to be performed if either it is a certain day, or a party has a given computational token. Alternatively, it could be performed if both requirements hold, that is, it is a specific day, and the party has received the computational token.

It should again be emphasized that the particular cryptographic functionality partitioning techniques described above are provided by way of illustration, and should not be construed as limiting the present invention to any specific embodiment or group of embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for partitioning of cryptographic functionality so as to permit delegation of at least one of a plurality of distinct portions of the cryptographic functionality from a delegating device to at least one recipient device, the cryptographic functionality being characterized as a graph comprising a plurality of nodes, the method comprising the steps of:

associating a given set of the nodes with a corresponding one of the plurality of distinct portions of the cryptographic functionality; and transmitting from the delegating device to the recipient device information representative of one or more of the nodes;

the recipient device being configured based on the transmitted information for authorized execution of a corresponding one of the plurality of distinct portions of the cryptographic functionality;

wherein the nodes of the graph are arranged in a plurality of levels with one or more nodes at each level;

wherein the nodes correspond to respective seeds;

wherein a first seed associated with a node of a first one of the levels is computed as a function of a second seed associated with a node of a second one of the levels higher than the first level;

the transmitted information including the first seed but not the second seed;

wherein the delegating device and the recipient device perform distinct functions; and wherein the delegating device and said at least one recipient device collectively perform the cryptographic functionality.

2. The method of claim 1 wherein at least one of the nodes of the graph corresponds to a seed the possession of which permits execution of a corresponding one of the distinct portions of the cryptographic functionality.

3. The method of claim 1 wherein the transmitting step further comprises transmitting from the delegating device to the recipient device information representative of at least two of the nodes.

4. The method of claim 1 wherein the transmitting step further comprises transmitting from the delegating device to the recipient device information representative of at least one parent node of the graph.

5. The method of claim 1 wherein the transmitting step further comprises transmitting from the delegating device to the recipient device information representative of at least one child node of a parent node of the graph.

6. The method of claim 1 wherein the graph comprises at least first and second root nodes.

7. The method of claim 1 wherein the graph comprises a tree having at least first and second subtrees associated with respective first and second ones of the plurality of distinct portions of the cryptographic functionality.

8. The method of claim 1 wherein the graph comprises a chain.

9. The method of claim 1 wherein the graph comprises L levels of nodes, an Lth one of the levels comprising a parent node $v_{L,1}$, and a first one of these levels comprising a set of seeds $v_{1,1}, v_{1,2}, \ldots v_{1,n}$, where n is the total number of seeds, each of the seeds being derivable from the parent node.

10. The method of claim 9 wherein an ith node of a kth one of the levels is computed as $f_k(i, v_{k+1})$, where $f_k$ is a one-way function.

11. The method of claim 10 wherein the nodes of one or more of the levels are arranged in the form of tuples of designated numbers of nodes.

12. The method of claim 11 wherein the ith node of a jth tuple of the kth level is computed as $f_k(j, i, v_{k+1,j})$.

13. The method of claim 1 wherein the cryptographic functionality comprises a cryptographic functionality provided by a hardware-based authentication token.

14. The method of claim 1 wherein the cryptographic functionality comprises an ability to verify at least one of an authentication code and a distress code generated by a hardware-based authentication token.

15. The method of claim 14 wherein the authentication token is configured to store at least two seeds, and the cryptographic functionality comprises a verification operation performed collaboratively by at least first and second servers each storing one of the seeds.

16. The method of claim 1 wherein the cryptographic functionality comprises an ability to generate at least one of an authentication code and a distress code utilizing a hardware-based authentication token.

17. The method of claim 1 wherein the cryptographic functionality comprises at least one of an ability to verify a signature and an ability to generate a signature.

18. The method of claim 1 wherein the cryptographic functionality comprises an ability to generate one or more values of a one-way chain.

19. The method of claim 1 wherein the cryptographic functionality comprises an ability to perform symmetric cryptographic operations.

20. The method of claim 1 wherein the cryptographic functionality comprises an ability to perform asymmetric cryptographic operations.

21. The method of claim 1 wherein the cryptographic functionality comprises an ability to derive one or more cryptographic keys.

22. The method of claim 1 wherein the cryptographic functionality comprises an ability to compute one or more seeds.

23. The method of claim 22 wherein at least one of the seeds corresponds to at least one of the nodes of the graph.

24. The method of claim 1 wherein the cryptographic functionality is partitioned in accordance with a subscription model which requires compliance with at least one specified criterion for transmission from the delegating device to the recipient device of the information representative of one or more of the nodes.

25. The method of claim 24 wherein compliance with the specified criterion is satisfied upon receipt of a designated payment.

26. The method of claim 1 wherein the recipient device and the delegating device collaborate to perform at least one of a cryptographic verification function and a cryptographic generation function.

27. The method of claim 26 wherein the recipient device includes only a limited computational ability associated with performance of the cryptographic function.

28. An apparatus comprising:

a processing device comprising a processor coupled to a memory;

the processing device being utilized in conjunction with partitioning of cryptographic functionality so as to permit delegation of at least one of a plurality of distinct portions of the cryptographic functionality from the processing device, configured as a delegating device, to at least one recipient device, the cryptographic functionality being characterized as a graph comprising a plurality of nodes;

the processing device being configured to associate a given set of the nodes with a corresponding one of the plurality of distinct portions of the cryptographic functionality, and to transmit to the recipient device information representative of one or more of the nodes, the recipient device being configured based on the transmitted information for authorized execution of a corresponding one of the plurality of distinct portions of the cryptographic functionality;

wherein the nodes of the graph are arranged in a plurality of levels with one or more nodes at each level;

wherein the nodes correspond to respective seeds;

wherein a first seed associated with a node of a first one of the levels is computed as a function of a second seed associated with a node of a second one of the levels higher than the first level;

the transmitted information including the first seed but not the second seed;

wherein the delegating device and the recipient device perform distinct functions; and wherein the delegating device and said at least one recipient device collectively perform the cryptographic functionality.

29. An apparatus comprising:

a processing device comprising a processor coupled to a memory;

the processing device being utilized in conjunction with partitioning of cryptographic functionality so as to permit delegation of at least one of a plurality of distinct portions of the cryptographic functionality to the processing device, configured as a recipient device, from at least one delegating device, the cryptographic functionality being characterized as a graph comprising a plurality of nodes;

a given set of the nodes being associated with a corresponding one of the plurality of distinct portions of the cryptographic functionality;

the processing device being operative to receive from the delegating device information representative of one or more of the nodes, the processing device being configured based on the received information for authorized execution of a corresponding one of the plurality of distinct portions of the cryptographic functionality;

wherein the nodes of the graph are arranged in a plurality of levels with one or more nodes at each level;

wherein the nodes correspond to respective seeds;

wherein a first seed associated with a node of a first one of the levels is computed as a function of a second seed associated with a node of a second one of the levels higher than the first level;

the received information including the first seed but not the second seed;

wherein the recipient device and the delegating device perform distinct functions; and wherein the recipient device and said at least one delegating device collectively perform the cryptographic functionality.

30. A non-transitory machine-readable storage medium containing one or more software programs for use in partitioning of cryptographic functionality so as to permit delegation of at least one of a plurality of distinct portions of the cryptographic functionality from a delegating device to at least one recipient device, the cryptographic functionality being characterized as a graph comprising a plurality of nodes, wherein the one or more software programs when executed by the delegating device implement the steps of:

associating a given set of the nodes with a corresponding one of the plurality of distinct portions of the cryptographic functionality; and transmitting from the delegating device to the recipient device information representative of one or more of the nodes;

the recipient device being configured based on the transmitted information for authorized execution of a corresponding one of the plurality of distinct portions of the cryptographic functionality;

wherein the nodes of the graph are arranged in a plurality of levels with one or more nodes at each level;

wherein the nodes correspond to respective seeds;

wherein a first seed associated with a node of a first one of the levels is computed as a function of a second seed associated with a node of a second one of the levels higher than the first level;

the transmitted information including the first seed but not the second seed;

wherein the delegating device and the recipient device perform distinct functions; and wherein the delegating device and said at least one recipient device collectively perform the cryptographic functionality.

\* \* \* \* \*